Aug. 26, 1952     E. H. WRIGHT     2,608,022

INSECT DESTROYER

Filed June 8, 1949

INVENTOR.
EVAN H. WRIGHT
BY
ATTORNEY

Patented Aug. 26, 1952

2,608,022

UNITED STATES PATENT OFFICE 2,608,022

INSECT DESTROYER

Evan H. Wright, Birmingham, Mich.

Application June 8, 1949, Serial No. 97,899

4 Claims. (Cl. 43—112)

This invention relates to an insect destroyer, and more particularly to an electric insect destroyer and catcher.

A primary object of the invention is to provide an electric insect destroyer which eliminates the possibility of accidently receiving an electrical shock therefrom.

Another object of the invention is to provide a device which attracts insects thereto by the use of light and an odoriferous medium.

Still another object of the invention is to provide a device which will provide sufficient light to be used as an illuminating means and which is attractive in appearance to the human eye.

Still another object of the present invention is to provide a device which will not become electrically shorted during normal rain showers.

A further object of the invention is to provide a catcher on the device which will catch the dead insects and prevent the possibility of fires when the device is used in barns, sheds and hay lofts and will prevent the litter of dead insects on the floor when used on porches and in homes.

A still further object of the invention is to provide a device which has a low cost of manufacture and is easy to assemble.

Other objects and advantages of the invention will more fully appear from the following description taken in connection with the accompanying drawings, in which.

Figure 1:
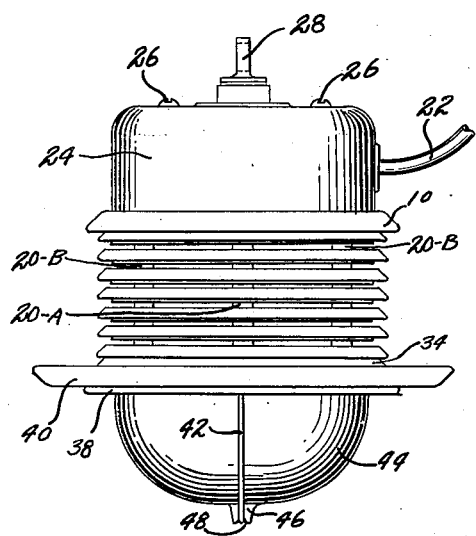
Fig. 1 is a side elevational view of the improved insect destroyer.
Figure 2:
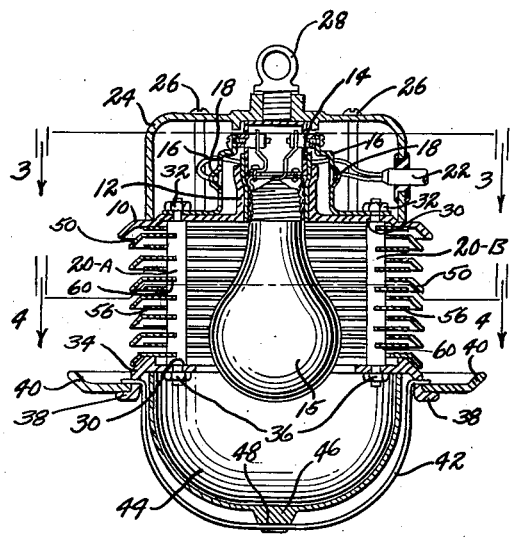
Fig. 2 is a sectional view of the device taken on line 2—2 of Fig. 3.
Figure 3:
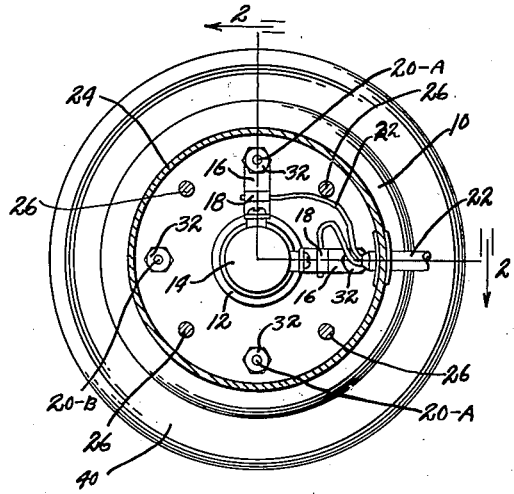
Fig. 3 is a sectional view taken on line 3—3 of Fig. 1.
Figure 4:
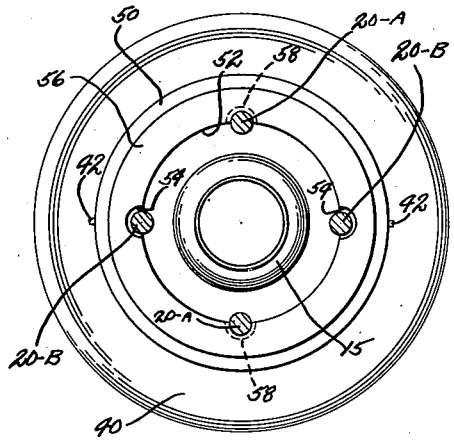
Fig. 4 is a sectional view taken on line 4—4 of Fig. 1.

Referring to the drawings, I have shown a top plate 10, made of plastic or some electrically nonconductive material, having a circular shape, and flanged at its outer edge. The top plate 10 is provided with a central opening having upturned edges 12 which are adapted to receive and frictionally engage a standard lamp socket 14 which is provided with a light bulb 15. Contact arms 16, provided with wire securing means 18, are secured to the terminals of the lamp socket 14 at one end and are connected to two of a plurality of posts 20-A and 20-B at the opposite end. The posts 20-A and 20-B are electrically charged, every other one being charged positively, designated as 20-A and the alternate remaining posts charged negatively and designated as 20-B. The lamp socket 14 and posts 20-A and 20-B are connected into an electrical circuit by means of electrical leads 22 engaged by the wire securing means 18. A housing 24 is secured to the top of the top plate 10 by screws 26, the housing 24 enclosing the socket 14 and the electrical contact members 16. An eye bolt 28 is carried by the housing 24 from which the device may be suspended.

The posts 20-A and 20-B have shoulders 30 at either end, the upper shoulders seating against the surface of the top plate 10 and are secured there by means of nuts 32, two of which perform the double service of securing the contact members 16 to the posts 20-A and 20-B. A bottom plate 34 made of plastic or some electrically nonconductive material is provided, secured against the lower shoulders 30 of the posts 20-A and 20-B by nuts 36. The bottom plate 34 is of a circular shape having a downwardly turned outer portion ending in an outwardly flanged edge 38. The outwardly flanged edge 38 provides a support or shelf upon which an apertured catch plate 40 rests. The plate 40 is of a circular shape and is provided with an upwardly flanged edge. Two oppositely disposed apertures are provided in the downwardly turned outer portion of the bottom plate 34 which rotatably receive the opposite ends of a downwardly bent wire 42. A transparent or translucent cup 44 is provided to seat against the lower surface of the bottom plate 34, within the downwardly turned portion thereof, and covering the lower extremities of the posts 20-A and 20-B. The cup 44 has a raised portion 46 centrally located on its outer surface, the raised portion 46 being provided with a transverse groove 48 which engages the wire 42 to secure the cup 44 to the bottom plate 34. An odoriferous evaporating material may be placed in the cup 44.

Secured to the posts 20-A, between the top plate 10 and the bottom plate 34, are a plurality of rings or fins 50. The fins 50 are circular in shape having downwardly flanged edges and are provided with a central aperture 52 and cut out portions 53 in order that they will not contact the posts 20-A. Alternately disposed between the fins 50 are another series of rings or fins 56 which are circular in shape and have a smaller outer diameter than the fins 50. The fins 56 are secured to the posts 20-A and are provided with a centrally located aperture and cut out portions 54 in order that they will not contact the posts 20-B. The fins 56 have a smaller outer diameter than the fins 50 and are covered by, but do not touch, the downwardly flanged portion of the fins 50.

In the assembly of this device, the fins 50 and 56 are secured to their respective posts 20-B and 20-A within slots 60 provided on the posts. The top plate 10, after having the lamp socket 14, lamp bulb 15, contact arms 16, and electrical wires 22 assembled thereto, is secured to the upper ends of the posts 20-A and 20-B. The housing 24 may now be attached to the upper surface of the top plate 10 by screws 26. The catch plate 40 and the bottom plate 34 are assembled and the bottom plate 34 secured to the lower ends of the posts 20-A and 20-B. The wire 42 is inserted into the apertures provided therefore, extending through the downwardly turned edge portion and over the catch plate 40, thereby locking the catch plate 40 between the ends of the wire 42 and the outwardly flanged edge 38 of the bottom plate 34. The cup 44 may now be filled with evaporating material and placed in position against the under surface of the bottom plate 34 and retained there by snapping the wire 42 into the groove 48 provided on the cup 44.

In the operation of this device, for instance in a dairy barn, the lamp is suspended by the eye bolt 28 and the electrical wires 22 connected with a source of electrical power. One set of fins carries a positive electrical charge and the other set of fins carries a negative electrical charge. The heat from the lamp bulb evaporates the aromatic material contained in the cup which in its own right attracts insects present in the barn and when used in conjunction with the light attraction of the lamp bulb has a very successful luring effect upon the insects. An insect, to reach the light and odoriferous material, must pass between two of the fins, these being the only openings to the interior of the device. The fins are so positioned as to be so close together than even small insects cannot pass through these openings without touching two of the fins. As each adjacent fin is charged electrically opposite, the insect is electrocuted upon touching any two adjacent fins. Any insects which are burning or that are hot enough to set a fire which drop from the fins of the device are caught by the catch plate 40 where they can safely cool off and be removed at a later time. In the event that the lamp bulb needs changing, the cup needs refilling, or the device needs cleaning, it is a simple matter to switch off the electrical current, unsnap the wire 42 and remove the cup, whereby access to the interior of the device may be had through the central opening of the bottom plate 34. It is highly improbable that a person will get an electrical shock from this device unless there is a deliberate attempt to force the fingers between the fins. The fins 56 are covered by the flanged edges of the fins 50 so that they are protected from touching and rain.

Not only does this device attract and exterminate insects and bugs of all sorts, but as shown in Fig. 1 of the drawings it provides an attractive and ornamental lighting fixture. The open louvered effect of the fins and the translucent or transparent property of the cup permit the lamp bulb to efficiently light the surrounding area.

The device has been illustrated in a preferred form of the invention but it will be understood that various changes including the size, shape and arrangement of parts may be made without departing from the spirit of my invention and it is not my intention to limit its scope other than by the terms of the appended claims.

I claim:

1. An insect destroyer, comprising an electric socket adapted to receive a lamp bulb, a cage supported by said socket having circumferentially spaced and alternately arranged positive and negative posts, a plurality of axially spaced fins carried by the positive posts, a plurality of fins carried by the negative posts and spaced between said first named fins, one group of fins having outer flanged edges extending outwardly and downwardly over the other group of fins and spaced therefrom, and electrical connections between said socket and said posts.

2. An insect destroyer, comprising a top plate, a bottom plate spaced axially from said top plate circumferentially spaced posts between said plates, axially spaced grooves in the outer surface of said posts, said grooves being alternately spaced axially with respect to an adjacent post, axially spaced metallic ring shaped fins carried in the grooves of said posts, each fin contacting alternate posts only, alternate fins overlapping the outer edge of an adjacent fin, a light bulb surrounded by said fins, electrical connections for supplying an electrical current to said light bulb and said posts, an outwardly extending tray carried by said bottom plate, a cup carried by said bottom plate forming a bottom closure for said bottom plate, and a single means for retaining said tray and said cup to said bottom plate.

3. An insect destroyer comprising, an electric socket adapted to receive a lamp bulb, an upper plate carried by said socket, a lower plate spaced from and concentric with said upper plate, a plurality of alternately arranged positive and negative posts circumferentially spaced between said plates and connecting them to form a cage around a lamp bulb in said socket, electrical connections for supplying an electrical current to said socket and said posts, axially spaced fins alternately connected to said positive and negative posts, said bottom plate having an outwardly extending flange depressed out of the plane of said bottom plate and forming a recess in the under surface of said bottom plate, a tray supported on the outwardly extending flange of said bottom plate, a cup in the recess of said bottom plate and a bail having its opposite ends pivotally supported on said bottom plate with the outer ends thereof overlapping the outwardly extending flange of said bottom plate for holding said tray on the flange, the central portion of said bail adapted to be sprung over said cup for holding the latter within the recess of said bottom plate.

4. An insect destroyer comprising, an electric socket adapted to receive a lamp bulb, an upper plate carried by said socket, a plurality of depending posts carried by said upper plate and spaced circumferentially around said socket, said posts being alternately connected to positive and negative electric terminals, a plurality of axially spaced rings carried by said positive posts, a plurality of rings carried by said negative posts and alternately spaced between said rings connected to said positive posts, the outer edges of one group of rings having flanges extending downwardly to at least the plane of said rings of the other group of rings and spaced outwardly therefrom.

EVAN H. WRIGHT.

REFERENCES CITED

The following references are of record in the file of this patent:

UNITED STATES PATENTS

| Number | Name | Date |
|---|---|---|
| 1,159,157 | Bass | Nov. 2, 1915 |
| 1,743,664 | Frost | Jan. 14, 1930 |
| 1,858,923 | Frost | May 17, 1932 |
| 1,982,123 | Rittenhouse | Nov. 27, 1934 |
| 1,986,361 | Rovinsky | Jan. 1, 1935 |

FOREIGN PATENTS

| Number | Country | Date |
|---|---|---|
| 187,037 | Switzerland | Jan. 2, 1937 |